United States Patent [19]

Sallai

[11] Patent Number: 4,940,301

[45] Date of Patent: Jul. 10, 1990

[54] METHOD AND APPARATUS FOR ENHANCING A HOLOGRAPHIC IMAGE BY CANDLELIGHT

[76] Inventor: Katalin Sallai, 4470 Ventura Canyon Ave.; No. F306 Sherman Oaks, Calif. 91423

[21] Appl. No.: 288,946

[22] Filed: Dec. 23, 1988

[51] Int. Cl.⁵ .................. G03H 1/00; F21V 33/00; F21V 35/00
[52] U.S. Cl. ..................... 350/3.6; 356/447; 40/152.2; 40/553; 40/559; 40/561
[58] Field of Search .............. 350/3.85, 3.86, 3.6; 362/127, 392, 447; 40/152.2, 540, 541, 553, 559, 561, 563

[56] References Cited

U.S. PATENT DOCUMENTS

| | | | |
|---|---|---|---|
| 162,144 | 4/1875 | Billingham | 40/563 |
| 933,531 | 9/1909 | Coffin | 40/563 |
| 1,518,834 | 12/1924 | Blatner | 40/541 |
| 1,523,441 | 1/1925 | Mincer | 40/563 |
| 1,884,290 | 2/1932 | Schults et al. | 40/152.2 |
| 4,175,750 | 11/1979 | Rugheimer et al. | 350/3.85 |

*Primary Examiner*—Bruce Y. Arnold
*Assistant Examiner*—Terry S. Callaghan
*Attorney, Agent, or Firm*—Thomas I. Rozsa

[57] ABSTRACT

A method and apparatus for enhancing a holographic image in order to create an eerie spiritual visual image which can be used in conjunction with religious pictures in hologram form or an eerie visual image of decorative scenes for home or office furnishing purposes or Halloween or other scary situations. A holographic film incorporating an image therein is placed between two plates of optically transparent material such as glass. A direct source of illumination of the image through candlelight set at the focal point distance in front of the hologram film, within its focal plane and at a location no lower than the lowermost point of the holographic image creates the enhanced image and eerie effect in a dark room.

16 Claims, 1 Drawing Sheet

U.S. Patent
Jul. 10, 1990
4,940,301
Fig. 1.
Fig. 2.
Fig. 3.
Fig. 4.
Fig. 5.
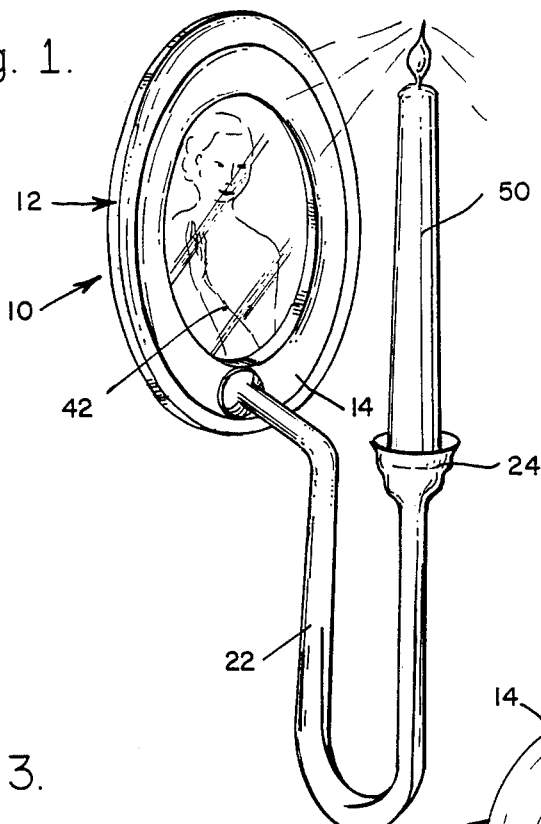
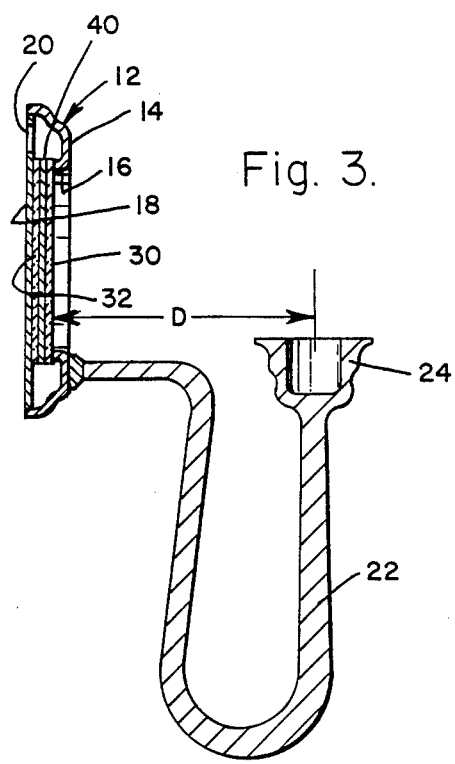
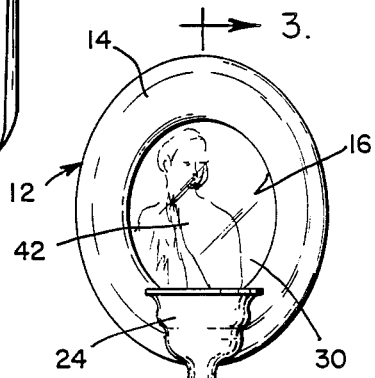
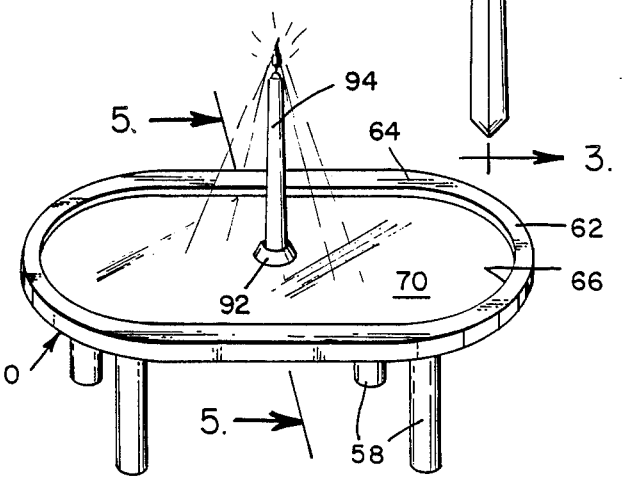
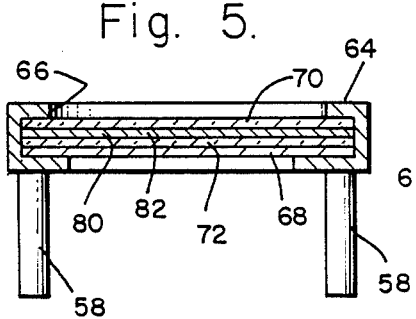

METHOD AND APPARATUS FOR ENHANCING A HOLOGRAPHIC IMAGE BY CANDLELIGHT

BACKGROUND OF THE INVENTION

1. Field Of The Invention

The present invention relates to decorative images set within a specific setting, which decorative images are created through holography. The present invention further relates to the enhancement of holographic images through utilization of specialized visualization techniques to create a desired effect from the holographic image.

2. Description Of The Prior Art

In general, a hologram is a three-dimensional picture that is made on a photographic film or plate without the use of a camera, that consists of a pattern of interference produced by a spirit coherent beam of radiation and especially light and that for viewing is illuminated with coherent light from behind. Holography has been known for many years and many techniques have been developed to use holographic films for many diverse applications. The following prior art patents illustrate known techniques for enhancing holographic images:

1. U.S. Pat. No. 3,601,466 issued to Tsuruta in 1969 for "Method For Detecting An Aberration-Compensated Image"— this invention relates to a method for sharply detecting an image which comprises: preparing a hologram with an aberration-free wave front and an aberrative front, illuminating the hologram with a wave front produced as a result of removing only the change in light path length caused by a phenomenon to be measured or of adding newly the change in the light path length from or to the aberration front, and effecting filtering such as the Schlieren method or phase difference method at the focus of the aberration-free wave front against the change in the wave front caused by the phenomenon and superimposed on the aberration-free wave front.

2. U.S. Pat. No. 4,296,994 issued to Quick, et al. in 1981 for "Method And Apparatus For Holographic Processing"—this invention relates to a method and apparatus for holographically processing optical signals in a fiber-optic system. Holographic processors are utilized in various combinations with light sources, fiber-optic transmission means, sensors and detectors to provide low cost, compact, sensitive and accurate sensor systems.

3. U.S. Pat. No. 3,884,553 issued to Graser, Jr. in 1975 for "Optical Display System With Improved Spectral Efficiency"—this invention relates to an optical system of the Fourier transform type for reconstructing spatial carrier modulated images using an off-axis light source to place a harmonic order diffraction spectrum on the system optical axis, in which the light source is composed of spectral components of differing wavelengths, a component of longer wavelength being displaced further from the axis than a component of shorter wavelength.

4. U.S. Pat No. 4,175,750 issued to Rugheimer et al in 1979 for "Holographic Puzzle"—this invention is a multi-element puzzle formed of segments of a hologram which has recorded thereon a holographic image of a scene or object. The puzzle pieces are formed of film and are arranged on an assembly stand which is illuminated by a specialized light source. Upon the player correctly orienting and arranging the puzzle pieces, the object or scene when viewed successively through the individual pieces will provide the viewer with a view which smoothly and coninuously changes in perspective according to the relationship between the viewer and the location of the individual puzzle pieces. 5. U.S. Pat. No. 4,429,947 to Benton in 1984 for "Reflection Mount For Transmission Holograms"— this invention relates to an apparatus for illuminating transmission holograms from the rear with an illumination source located in front of the hologram, comprising a reflector and a light trap adapted to be mounted behind the hologram at a location chosen to reflect light from the source through the hologram as though from a source behind the hologram, while reflecting ambient light from the direction of an observer of the hologram into the trap. In this device, outside reflected light isn't utilized in order to enhance the image.

6. U.S. Pat. No. 3,598,467 issued to Pearson in 1971 for "Fiber Optic Diffuser For Holography"—this invention relates to a holographic apparatus capable of utilizing a pulsed laser developing an incompletely cohererent light beam for recording holograms. The apparatus makes use of a bundle of transparent fibers used as a new optical element. This fiber bundle serves both the purpose of directing the light toward the object to be recorded and of scrambling of diffusing the light from the source. The apparatus disclosed is a fiber optic diffuser for holography which employs a bundle of transparent fibers. The source of light is a laser beam or similar direct source of light.

All of the devices above involve complicated apparatus for a specialized purpose. None of the devices disclose a novel yet simple way of enhancing a holographic image for decorative purposes. A significant need exists for such a method and apparatus for enhancement of images which includes religious images and decorative home furnishing images.

SUMMARY OF THE INVENTION

The present invention relates to a novel method and apparatus for enhancing a holographic image in order to create an eerie spiritual visual image which can be used in conjunction with religious pictures in hologram form or an eerie visual image of decorative scenes for home or office furnishing purposes. The present invention incorporates the novel feature of placing a holographic film incorporating an image therein between two plates of optically transparent material such as glass and having a direct source of illumination of the image through candlelight set at the focal point distance in front of the hologram film and within its focal plane and a location no lower than the lowermost point of the holographic image.

It has been discovered, according to the present invention, that if a holographic image is created by placing holographic film between optically transparent surfaces and illuminating the holographic image by candlelight set at the focal point distance of the optically transparent material and holographic film in front of the holographic film and at a location within its focal plane and no lower than the lowermost point of the film, then the candlelight will illuminate the holographic film in a manner so as to cause the visual holographic image therein to create an eerie and spiritualistic visual image.

It has further been discovered, according to the present invention, that if the holographic film is placed between two pieces of flat optically transparent material within a frame which in turn supports the lighted candle in front of the frame by a distance equal to the focal point of the optically transparent material and holographic film, then a spiritual religious picture such

MISSING PAGE TEMPORARY NOTICE

PATENT # 4940,301 FOR ISSUE DATE 7-10-90 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 3/4 ing orientation through the first optically transparent member 30 and through opening 16 in front wall 14 of frame member 12. In the preferred embodiment, first optically transparent member 30 is glass and second optically transparent member 32 is also glass.

Frame member 12 further comprises a candle mounting means 22 which as illustrated in FIG. 1 extends from the lower portion of front wall 14 and terminates in a candle retaining portion 24. Candle retaining portion 24 is set such that it is aligned with the lowermost portion of opening 16 and therefore aligned with the lowermost portion of the photographic emulsion 40 and light holographic picture 42 which can be transmitted through first optically transparent member 30 and opening 16. Referring to FIG. 3, the distance between the first optically transparent member 30 and the centerline of the candle retaining portion 24 is approximately equal to the focal length distance of the first optically transparent member 30 and light holographic picture 42. As used here, the focal length is defined as the distance of a focus from the surface transmitting the visual image. The focal plane is defined as a plane that is perpendicular to the axis of the surface transmitting the visual image and passes through the focal point of the surface. While the candle retaining portion 24 can be closer or further away than the distance D, it is preferred that it be at approximately the distance D in order to produce the most enhanced effect. Candle retaining portion 24 retains a candle 50 therein. When the candle 50 is lit in a darkened room, the combination of the photographic emulsion 40 with the light holographic picture 42 therein between two optically transparent members 30 and 32 and light by candlelight from the candle 50 with the flame from the candle at a distance approximately set within the focal length and burning along the focal plane of the first light transparent surface 30 and holographic picture 42 causes the candle 50 to create a visually enhanced image of the light holographic picture 42 and causes the light holographic picture 42 to appear in an eerie image. If the light holographic picture is a religious picture, the eerie enhanced image adds religious significance to the picture. If the light holographic picture 42 is of a scary thing such as a monster, the eerie and scary image is enhanced. If the light holographic image 42 is of a scene, the scene is enhanced. Therefore, through use of this combination, the candlelight set within the focal plane at distance above the lowermost point of the picture enables the holographic picture 42 to be lit from the front (as opposed to the rear) without the necessity of prisms, lasers or other expensive equipment, and creates an usual and eerie appearance of the image.

More broadly defined, the present invention is an apparatus for enhancing a holographic image, comprising: (a) a vertically aligned frame member comprising a front wall having a vertically aligned opening therein and a rear wall separated from the front wall by a gap; (b) a vertically aligned first optically transparent member; (c) a vertically aligned second optically transparent member; (d) said first optically transparent member and said second optically transparent member set within the gap of said frame such that said first optically transparent member lies adjacent said front wall with a portion of the first optically transparent member aligned with the opening in said front wall and said second optically transparent member set behind and adjacent to the first optically transparent member; (e) a photographic emulsion including a light holographic picture located between said first optically transparent member and said second optically transparent member and aligned with the opening in the front wall of said frame member; (f) a candle mounting means including a candle retaining portion set in front of the front wall of said frame member; and (g) a candle retained within the candle retaining portion of said candle mounting means in a manner so as to enable the flame from the candle when lighted to be located at approximately the focal point distance in front the first optically transparent surface and light holographic picture and to burn along the focal plane of the first optically transparent member and light holographic picture at a height equal to or above the lowermost portion of the opening in said front wall of said frame to thereby cause the light holographic picture to become visible. Said candle mounting means extends from the lower portion of the front wall of said frame member and terminates in said candle retaining portion which is set such that it is aligned with the lowermost portion of said opening in said front wall. The distance between said first optically transparent surface and the centerline of said candle retaining portion of said candle mounting means is approximately equal to the focal length distance of the first optically transparent member and light holographic picture.

The photographic emulsion and light holographic picture can be attached to said first optically transparent member. The photographic emulsion and light holographic picture can be attached to said second optically transparent member.

While the frame member 10 is primarily intended to be vertically mounted on a surface such as a wall, the same concept can be incorporated into a horizontal surface such as a table. Referring to FIGS. 4 and 5, the table 60 is designed to have an external frame 62 which supports the legs 58. The external frame 62 has a top surface 64 having a central opening 66 therein. While the opening 66 is shown as oval, it will be appreciated that the opening 66 can be of any desired shape such as circular, square, rectangular or any polygonal shape. The external frame 62 also has a bottom surface 68. Referring particularly to the cross-sectional view of FIG. 5, one key feature of the present invention is disclosed therein. Set within the external table frame 62 are a pair of optically transparent members 70 and 72 which are supported between top surface 64 and bottom surface 68. Top optically transparent surface 70 is adjacent to top surface 64 of table frame member 62 and is set therein such that a portion of top optically transparent member 70 is aligned with opening 66 in top surface 64. Bottom optically transparent member 72 is adjacent table bottom surface 68. Top and bottom optically transparent members 70 and 72 are aligned such that their surfaces are adjacent each other. Set between the two optically transparent members 70 and 72 is a photographic emulsion 80 into which has been embedded a light holographic picture 82. In general, a hologram is a three-dimensional picture that is made on a photographic film or plate without the use of a camera, that consists of a pattern of interference produced by a split coherent beam of radiation and especially light and that for viewing is illuminated with coherent light from behind. The special photographic emulsion 80 and light holographic picture 82 of the present invention cannot be seen when the room is dark but if a source of light shines onto the picture from above it, the combination of the pair of light transparent members 70 and 72 surrounding the photographic emulsion 80 and light holographic picture 82 therein enable the image to seen. The photographic emulsion 80 and light holographic picture 82 can be independently formed as set between the two optically transparent surfaces as illustrated in FIG. 5 or the photographic emulsion 80 and light holographic picture 82 can be embedded onto either the top transparent surface 80 or the bottom transparent surface 82. The light holographic picture 82 is set within the photographic emulsion 80 which is arranged relative to the two optically transparent members 70 and 72 such that the picture is transmitted right side up and in the proper viewing orientation through the top optically transparent member 70 and through opening 66 in top surface 64 of external table frame member 62. In the preferred embodiment, top optically transparent member 70 is glass and bottom optically transparent member 72 is also glass.

A candle retaining means 92 rests on top surface 70 and retains a candle 94 therein. The candle 94 shines down on top surface 70 and on the photographic emulsion 80 and light holographic picture 82 therein. When the candle 94 is lit in a darkened room, the combination of the photographic emulsion 80 with the light holographic picture 82 therein between two optically transparent members 70 and 72 and lit by candlelight from the candle 94 shining down on them causes the candle 94 to create a visually enhanced image of the light holographic picture 82 and causes the light holographic picture 82 to appear in an eerie image. If the light holographic picture is a religious picture, the eerie enhanced image adds religious significance to the picture. If the light holographic picture 82 is of a scary thing such as a monster, the eerie and scary image is enhanced. If the light holographic picture 82 is of a scene, the scene is enhanced. Therefore, through use of this combination, the candlelight set above the picture enables the holographic image to be lit from above (as opposed to being lit from the rear or below) without the necessity of prisms, lasers or other expensive equipment, and creates an usual and eerie appearance of the image.

Defined more broadly, the present invention is an apparatus for enhancing a holographic image, comprising: (a) a horizontally aligned frame member comprising a top surface having an opening therein and a bottom surface separated from the top surface by a gap; (b) a horizontally aligned first optically transparent member; (c) a horizontally aligned second optically transparent member (d) said first optically transparent member and said second optically transparent member set within the gap of said frame such that said first optically transparent member lies adjacent said top surface with a portion of the first optically transparent member aligned with the opening in said top surface and said second optically transparent member set below and adjacent to the first optically transparent member; (e) a photographic emulsion including a light holographic picture located between said first optically transparent member and said second optically transparent member and aligned with the opening in the top surface of said frame member; (f) a candle retaining means; and (g) a candle retained by the candle retaining means in a manner so as to enable the flame from the candle when lighted to be located above the first optically transparent member and above the opening in the top surface of said frame to shine down on the first optically transparent member and the light holographic picture to thereby cause the light holographic picture to become visible.

Said photographic emulsion and light holographic picture can be attached to said first optically transparent member. Said photographic emulsion and light holographic picture can be attached to said second optically transparent member.

The present invention can also be defined as an apparatus for enhancing a holographic image, comprising: (a) a horizontally aligned frame member of a table supported at a distance above the ground and comprising a top surface having an opening therein and a bottom surface separated from to top by a gap; (b) a horizontally aligned first optically transparent member; (c) a horizontally aligned second optically transparent member; (d) said first optically transparent member and said second optically transparent member set within the gap of said frame member of said table such that said first optically transparent member lies adjacent said top surface with a portion of the first optically transparent member aligned with the opening in said top surface and said second optically transparent member set below and adjacent to the first optically transparent member; (e) a photographic emulsion including a light holographic picture located between said first optically transparent member and said second optically transparent member and aligned with the opening in the top surface of said frame member of said table; (f) a candle retaining means; and (g) a candle retained by the candle retaining means in a manner so as to enable the flame from the candle when lighted to be located above the first optically transparent member of said table to shine down on the first optically transparent member and the light holographic picture to thereby cause the light holographic picture to become visible.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. An apparatus for enhancing a holographic image, comprising:
   a. a vertically aligned frame member comprising a front wall having a vertically aligned opening therein and a rear wall separated from the front wall by a gap;
   b. a vertically aligned first optically transparent member;
   c. a vertically aligned second optically transparent member;
   d. said first optically transparent member and said second optically transparent member set within the gap of said frame such that said first optically transparent members lies adjacent said front wall with a portion of the first optically transparent member aligned with the opening in said front wall and said second optically transparent member set behind and adjacent to the first optically transparent member;

e. a photographic emulsion including a holographic picture attached to said first optically transparent member and located between said first optically transparent member and said optically transparent member and aligned with the opening in the front wall of said frame member;

f. a candle mounting means including a candle retaining portion set in front of the front wall of said frame member; and g. a candle retained within the candle retaining portion of said candle mounting means in a manner so as to enable the flame from the candle when lighted to illuminate the holographic picture from in front of the holographic picture and illuminate the holographic picture at a height equal to or above the lowermost portion of the opening in said front wall of said frame to thereby cause the holographic picture to become visible.

2. The apparatus in accordance with claim 1 wherein said first optically transparent member is made of glass.

3. The apparatus in accordance with claim 1 wherein said second optically transparent member is made of glass.

4. The apparatus in accordance with claim 1 wherein said candle mounting means extends from the lower portion of the front wall of said frame member and terminates in said candle retaining portion which is set such that it is aligned with the lowermost portion of said opening in said front wall.

5. The apparatus in accordance with claim 1 further comprising means for mounting said frame member on a wall.

6. An apparatus for enhancing a holographic image, comprising:

a. a vertically aligned frame member comprising a front wall having a vertically aligned opening therein and a rear wall separated from the front wall by a gap;

b. a vertically aligned first optically transparent member;

c. a vertically aligned second optically transparent member;

d. said first optically transparent member and said second optically transparent member set within the gap of said frame such that said first optically transparent member lies adjacent said front wall with a portion of the first optically transparent member aligned with the opening in said front wall and said second optically transparent member set behind and adjacent to the first optically transparent member;

e. a photographic emulsion including a holographic picture attached to said second optically transparent member and located between said first optically transparent member and said second optically transparent member and aligned with the opening in the front wall of said frame member;

f. candle mounting means including a candle retaining portion set in front of the front wall of said frame member; and g. a candle retained within the candle retaining portion of said candle mounting means in a manner so as to enable the flame from the candle when lighted to illuminate the holographic picture from in front of the holographic picture and illuminate the holographic picture at a height equal to or above the lowermost portion of the opening in said front wall of said frame to thereby cause the holographic picture to become visible.

7. The apparatus in accordance with claim 6 wherein said first optically transparent member is made of glass.

8. The apparatus in accordance with claim 6 wherein said second optically transparent member is made of glass.

9. The apparatus in accordance with claim 6 wherein said candle mounting means extends from the lower portion of the front wall of said frame member and terminates in said candle retaining portion which is set such that it is aligned with the lowermost portion of said opening in said front wall.

10. The apparatus in accordance with claim 6 further comprising means for mounting said frame member on a wall.

11. An apparatus for enhancing a holographic image, comprising:

a. a horizontally aligned frame member of a table supported at a distance above the ground and comprising a top surface having an opening therein and a bottom surface separated form the top surface by a gap;

b. a horizontally aligned first optically transparent member;

c. a horizontally aligned second optically transparent member;

d. said first optically transparent member and said second optically transparent member set within the gap of said frame member of said table such that said first optically transparent member lies adjacent said top surface with a portion of the first optically transparent member aligned with the opening in said top surface and said second optically transparent member set below and adjacent to the first optically transparent member;

e. a photographic emulsion including holographic picture attached to said first optically transparent member and located between said first optically transparent member and said second optically transparent member and aligned with the opening in the top surface of said frame member of said table;

f. a candle retaining means; and g. a candle retained by the candle retaining means in a manner so as to enable the flame from the candle when lighted to be located above the first optically transparent member and above the opening in the top surface of said frame member of said table to shine down on the first optically transparent member and the holographic picture to thereby cause the holographic picture to become visible 12. The apparatus in accordance with claim 11 wherein said first optically transparent member is made of glass.

13. The apparatus in accordance with claim 11 wherein said second optically transparent member is made of glass.

14. An apparatus for enhancing a holographic image, comprising:

a. a horizontally aligned frame member of a table supported at a distance above the ground and comprising a top surface having an opening therein and a bottom surface separated from the top surface by a gap;

b. a horizontally aligned first optically transparent member;

c. a horizontally aligned second optically transparent member;

d. said first optically transparent member and said second optically transparent member set within the gap of said frame member of said table such that said first optically transparent member lies adjacent said top surface with a portion of the first optically transparent member aligned with the opening in said top surface and said second optically transparent member set below and adjacent to the first optically transparent member;

e. a photographic emulsion including a holographic picture attached to said second optically transparent member and located between said first optically transparent member and said optically transparent member and aligned with the opening in the top surface of said frame member of said table;

f. a candle retaining means; and g. a candle retained by the candle retaining means in a manner so as to enable the flame from the candle when lighted to be located above the first optically transparent member and above the opening in the top surface of said frame member of said table to shine down on the first optically transparent member and the holographic picture to thereby cause the holographic picture to become visible.

15. The apparatus in accordance with claim 14 wherein said first optically transparent member is made of glass.

16. The apparatus in accordance with claim 14 wherein said second optically transparent member is made of glass.

* * * * *